US012732900B2

(12) United States Patent
Chande et al.

(10) Patent No.: US 12,732,900 B2
(45) Date of Patent: Sep. 8, 2026

(54) CRITERION AND CONFORMANCE TEST FOR ELIGIBILITY OF SENSING BEAMS FOR CHANNEL ACCESS

(71) Applicant: QUALCOMM Incorporated, San Diego, CA (US)

(72) Inventors: Vinay Chande, San Diego, CA (US); Jing Sun, San Diego, CA (US); Arumugam Chendamarai Kannan, San Diego, CA (US); Giovanni Chisci, San Diego, CA (US); Siyi Chen, Beijing (CN); Mohammed Ali Mohammed Hirzallah, San Marcos, CA (US); Aleksandar Damnjanovic, Del Mar, CA (US); Xiaoxia Zhang, San Diego, CA (US); Tao Luo, San Diego, CA (US)

(73) Assignee: QUALCOMM Incorportated, San Diego, CA (US)

( * ) Notice: Subject to any disclaimer, the term of this patent is extended or adjusted under 35 U.S.C. 154(b) by 35 days.

(21) Appl. No.: 18/576,340

(22) PCT Filed: Aug. 6, 2021

(86) PCT No.: PCT/CN2021/111100

§ 371 (c)(1),
(2) Date: Jan. 3, 2024

(87) PCT Pub. No.: WO2023/010501

PCT Pub. Date: Feb. 9, 2023

(65) Prior Publication Data

US 2024/0340064 A1 Oct. 10, 2024

(51) Int. Cl.
*H04W 48/16* (2009.01)
*H04W 74/0808* (2024.01)

(52) U.S. Cl.
CPC ....... *H04W 48/16* (2013.01); *H04W 74/0808* (2013.01)

(58) Field of Classification Search
CPC . H04B 7/0695; H04W 48/16; H04W 74/0808
See application file for complete search history.

(56) References Cited

U.S. PATENT DOCUMENTS 11,064,518 B2 7/2021 Chendamarai Kannan et al.
2019/0261378 A1* 8/2019 Chendamarai ...... H04W 72/046
(Continued)

FOREIGN PATENT DOCUMENTS

CN 108833034 A 11/2018
CN 110784922 A 2/2020
(Continued)

OTHER PUBLICATIONS

International Search Report and Written Opinion—PCT/CN2021/111100—ISA/EPO—Mar. 30, 2022.
(Continued)

*Primary Examiner* — Jaison Joseph
(74) *Attorney, Agent, or Firm* — Dinsmore & Shohl LLP

(57) ABSTRACT

Certain aspects of the present disclosure provide techniques for determining if a first sensing beam is eligible for use in channel sensing by a device under test (DUT) for at least a first transmission beam, generally including evaluating the first sensing beam against eligibility criterion based on measurement of sensing gain for the first sensing beam in multiple directions and declaring the first sensing beam eligible for channel sensing for the first transmission beam when the first sensing beam satisfies the eligibility criterion.

20 Claims, 9 Drawing Sheets

800

Evaluate a first sensing beam against eligibility criterion based on measurement of sensing gain for the first sensing beam in multiple directions — 805

↓

Declare the first sensing beam eligible for channel sensing for the first transmission beam when the first sensing beam satisfies the eligibility criterion — 810

(56) References Cited

U.S. PATENT DOCUMENTS

2020/0059922 A1* 2/2020 John Wilson et al. ...................... H04W 72/046
2020/0336921 A1* 10/2020 Yerramalli .......... H04W 72/046
2020/0413268 A1 12/2020 Yerramalli et al.
2020/0413449 A1 12/2020 Yerramalli et al.
2021/0029740 A1 1/2021 Yerramalli et al.
2024/0340064 A1* 10/2024 Chande ................. H04W 48/16

FOREIGN PATENT DOCUMENTS

CN 111418255 A 7/2020
WO 2019067297 4/2019
WO 2021108817 A2 6/2021

OTHER PUBLICATIONS

Qualcomm Incorporated: "Channel Access Mechanism for NR in 52.6 to 71GHz Band", 3GPP TSG RAN WG1 Meeting #102-e, R1-2006798, e-Meeting, Aug. 17-Aug. 28, 2020, 13 Pages, Sections 2.1-2.5, The Whole Document.
Supplementary European Search Report—EP219523784—Search Authority—The Hague—Mar. 21, 2025.

* cited by examiner

Sensing beam passes eligibility test if $Z_i \leq Z_0 + X$ for a set of choices of directions $\theta$

CRITERION AND CONFORMANCE TEST FOR ELIGIBILITY OF SENSING BEAMS FOR CHANNEL ACCESS

CROSS-REFERENCE TO RELATED APPLICATIONS

This application is a national stage application under 35 U.S.C. 371 of PCT/CN2021/111100, filed Aug. 6, 2021, which is hereby expressly incorporated by reference herein in its entirety as if fully set forth below and for all applicable purposes.

INTRODUCTION

Aspects of the present disclosure relate to wireless communications, and more particularly, to techniques for determining sensing beams eligible for performing channel access for one or more transmission beams.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for determining if a first sensing beam is eligible for use in channel sensing by a device under test (DUT) for at least a first transmission beam includes evaluating the first sensing beam against eligibility criterion based on measurement of sensing gain for the first sensing beam in multiple directions; and declaring the first sensing beam eligible for channel sensing for the first transmission beam when the first sensing beam satisfies the eligibility criterion.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for determining eligible sensing beams for use in channel sensing.

For higher unlicensed bands (e.g., 60 GHz), transmission is highly directional. The energy sensing that is part of listen before talk (LBT) in many channel access procedures can also use (relatively narrow) directional sensing beams. On the other hand, wider sensing beams for a channel occupancy time (COT) during which a device will transmit with narrow transmission beams may also be of interest. One challenge is how to specify a relationship between a sensing beam and a transmission beam. It is challenging because absolute beamforming gains of sensing beams are difficult to obtain and connect (associate) with transmission beams. Two sensing beams can behave differently for a given transmission beam. For example, even if the sensing beam gain along the direction of maximum Effective Isotropic Radiated Power (EIRP) is kept the same, the choice of sensing beam can affect the measurements of energy or interference done for the purpose of channel access, for example, in case of LBT.

Aspects of the present disclosure provide testable criterion that may help evaluate candidate sensing beams to determine their eligibility (as being suitable) for channel sensing for a COT for transmissions by a transmission beam.

The testable criterion for directional sensing provided herein may facilitate connecting transmission beam patterns with sensing beam patterns for energy detection ED. Benefits of the techniques proposed herein include the applicability of the criterion and the testing procedure to wide-beam sensing and that the testing procedure can be applied to multi-beam COTs independently per beam LBT.

Introduction to Wireless Communication Networks

Figure 1:
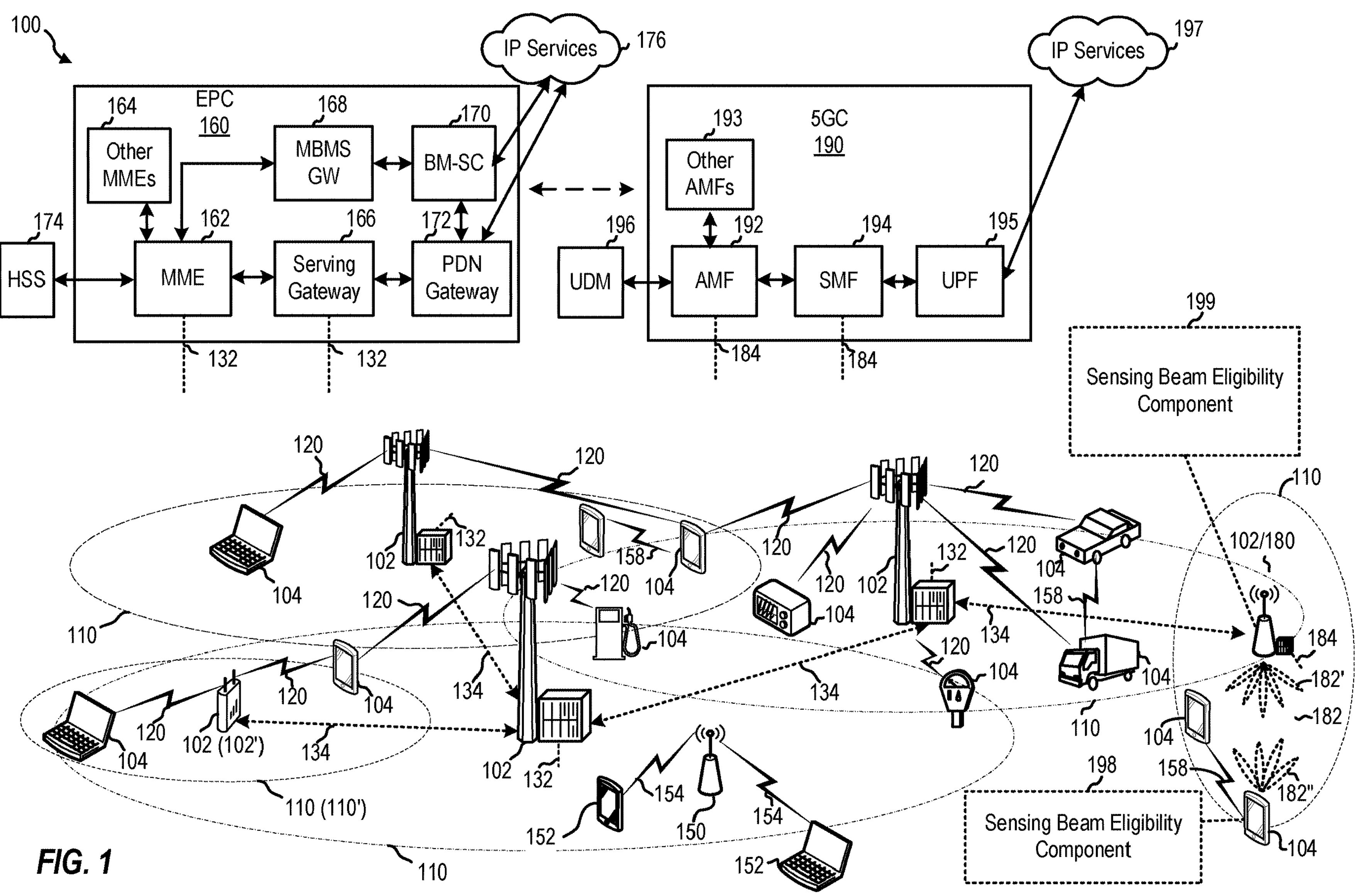
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes Sensing Beam Eligibility Component 199, which may be configured to determine sensing beam eligibility. Wireless network 100 further includes Sensing Beam Eligibility Component 198, which may be used configured to determine system beam eligibility.

Figure 2:
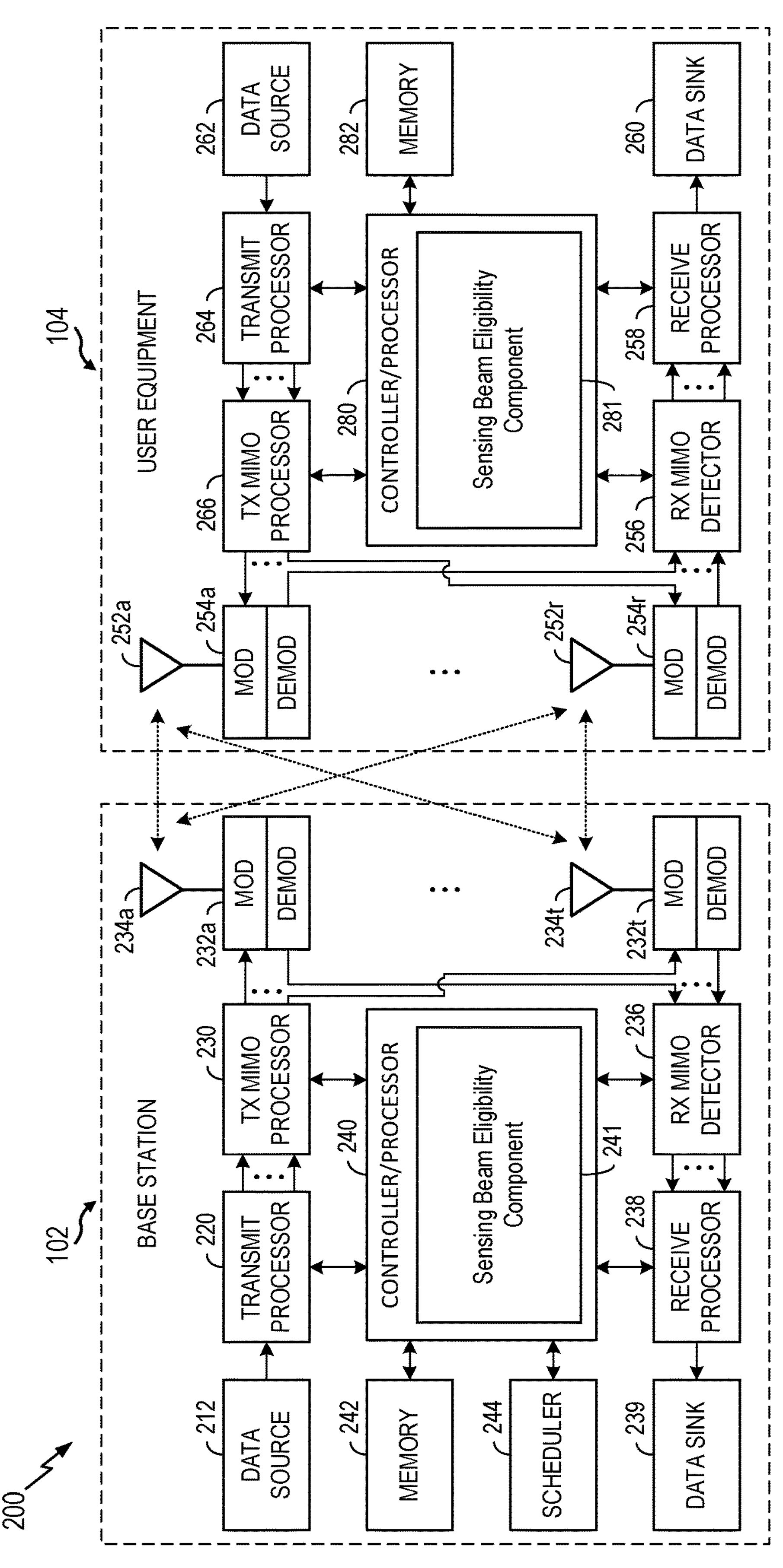
FIG. 2 is a block diagram conceptually illustrating aspects of an example a base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes Sensing Beam Eligibility Component 241, which may be representative of Sensing Beam Eligibility Component 199 of FIG. 1. Notably, while depicted as an aspect of controller/processor 240, Sensing Beam Eligibility Component 241 may be implemented additionally or alternatively in various other aspects of base station 102 in other implementations.

Generally, user equipment 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes Sensing Beam Eligibility Component 281, which may be representative of Sensing Beam Eligibility Component 198 of FIG. 1. Notably, while depicted as an aspect of controller/processor 280, Sensing Beam Eligibility Component 281 may be implemented additionally or alternatively in various other aspects of user equipment 104 in other implementations.

Figures 3A, 3B, 3C, 3D:
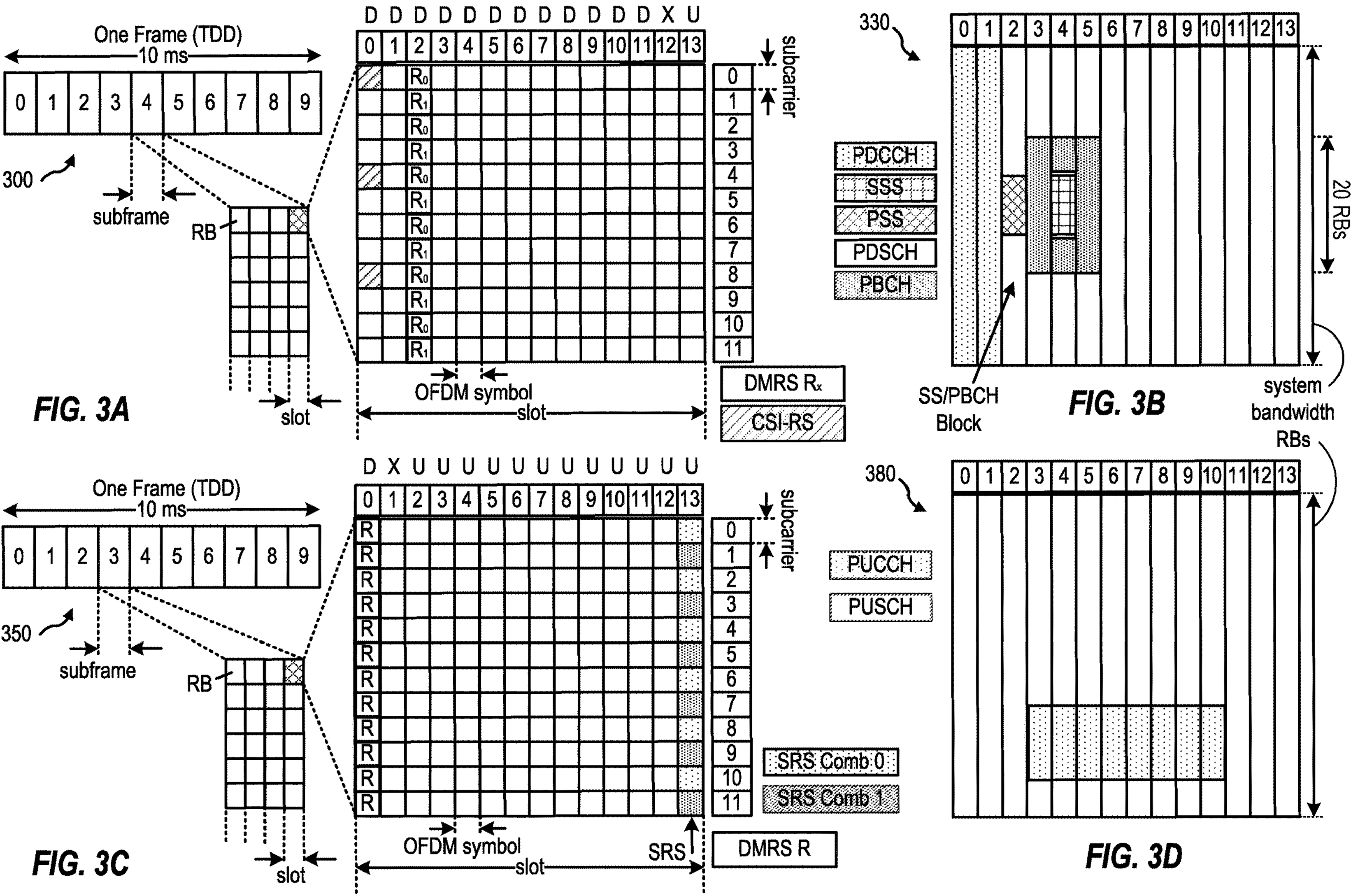
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHZ, FR1 is often referred to (interchangeably) as a “Sub-6 GHz” band in various documents and articles. A similar nomenclature issue sometimes occurs with regard to FR2, which is sometimes referred to (interchangeably) as a “millimeter wave” (“mmW” or “mmWave”) band in documents and articles, despite being different from the extremely high frequency (EHF) band (30 GHz-300 GHz), which is identified by the International Telecommunications Union (ITU) as a “millimeter wave” band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term “sub-6 GHz” or the like if used herein may broadly represent frequencies that may be less than 6 GHZ, may be within FR1, or may include mid-band frequencies. Further, unless specifically stated otherwise, it should be understood that the term “millimeter wave” or the like if used herein may broadly represent frequencies that may include mid-band frequencies, may be within FR2, or may be within the EHF band.

Communications using the mmWave/near mmWave radio frequency band (e.g., 3 GHZ-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182''. UE 104 may also transmit a beamformed signal to the base station 180 in one or more transmit directions 182''. Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Example Channel Access in Unlicensed Spectrum

Aspects of the present disclosure relate to wireless communications, and more particularly, to techniques for determining beams suitable for performing channel sensing for communications using unlicensed spectrum.

Dedicated spectrum is not guaranteed in some regions due to scarcity of spectrum. For example, in some areas/countries, there is dedicated spectrum allocated for certain communications (e.g., specified in LTE Release-14 and Release-15), but no spectrum available for other types of communications (e.g., specified in NR Release-16 targeting advanced V2X use cases like autonomous driving).

Use of unlicensed spectrums is typically subject to various regulatory requirements depending on the region. One of the requirements is a channel access procedure referred to as listen before talk (LBT). LBT mandates that a device only transmits (talks) in an unlicensed channel if the channel is sensed (by listening) to be free. LBT may mean that the device performs a clean channel assessment (CCA) that involves measuring energy or power in the channel for a certain duration of time. Exactly when devices transmit may depend on a particular category of LBT. For a category 2 (CAT 2) LBT, the device transmits if the CCA indicates the channel is free; e.g., Type 2 channel access procedures as specified in 3GPP. For a category 4 (CAT 4) LBT, the device performs random back-off within a contention window (extended CCA) if CCA indicates the channel is free, and transmits only when channel is still free during the back-off period; e.g., Type 1 channel access procedures as specified in 3GPP.

Related to Criterion and Conformance Testing for Eligibility of Sensing Beams for LBT for Unlicensed Bands Aspects of the present disclosure relate to wireless communications, and more particularly, to techniques for determining sensing beams eligible for performing channel access for one or more transmission beams.

The techniques may be used to determine beams eligible for LBT channel sensing in higher unlicensed bands (e.g., 60 GHZ), where transmissions are highly directional. For example, referring to FIG. 4, the techniques presented herein may be able to determine eligibility of a directional sensing beam for a transmission beam or pattern of transmission beams (e.g., Tx1 and Tx2).

Figure 4:
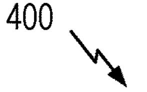
FIG. 4 depicts an example of a sensing beam that may be determined eligible for performing channel sensing for one or more transmission beams, according to aspects of the present disclosure.
Figure 4:
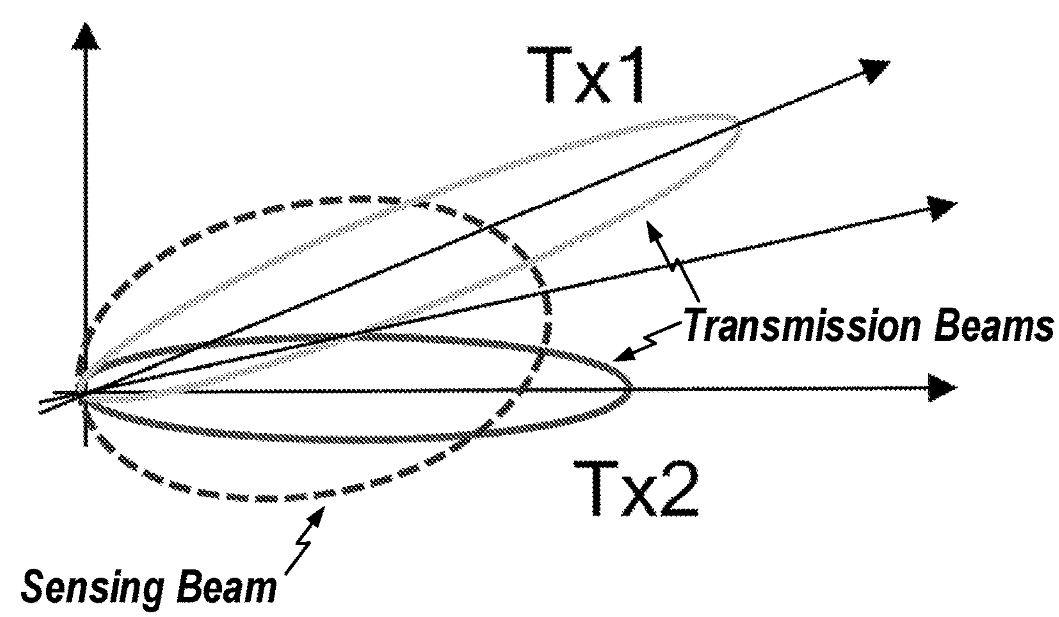

As illustrated in FIG. 4, defining directional sensing involves connecting (or associating) a transmission beam or transmission beam patterns with a sensing beam pattern. Aspects of the present disclosure provide testable criterion that may be evaluated to determine which sensing beam is eligible for LBT for a COT that uses a set of one or more transmission beams.

As noted above, absolute beamforming gains of sensing beams are hard to obtain and connect with transmission beams. Two sensing beams can behave differently for a given transmission beam, such that even if the sensing beam gain along the direction of maximum EIRP is kept the same, the choice of sensing beam can affect the handling of interference footprint of side lobes.

The testable eligibility criterion proposed herein may help facilitate connecting transmission beam patterns, sensing beam patterns, and choice of energy detection (ED). In some cases, the eligibility testing procedure proposed herein may use a form of an LBT regulation conformance test for connecting a device's transmit beam and sensing beam along the direction of peak EIRP and use a relative criterion on sensing beam gains along directions of high EIRP to define eligibility. Aspects of the present disclosure also provide conformance test procedures that can verify that testing criterion used to determine eligibility of sensing beams.

A test referred to as an adaptivity test may use the following equation for energy detection threshold (EDT), as a function of maximum EIRP and bandwidth:

$$EDT = -80\text{ dBm} + 10\times\log10\ (BW[\text{MHz}]) + 10\times\log10(40[\text{dBm}]/EIRP).$$

In an adaptivity conformance test, a contending initiating device (a device contending for channel access) must sense the medium using a clear channel access (CCA) check procedure and determine if the energy detected exceeds the EDT. If the sensed energy exceeds the threshold due to an interferer, a conforming device (a device conforming to the test) is expected not to occupy the medium for a period of time.

The adaptivity conformance test typically places the interferer (a single continuous waveform) in the direction of the peak EIRP. The power level at the interferer may be set to cause an energy detection threshold to be just exceed at the device under test (DUT). The test be designed to ensure that a DUT does not transmit when the interferer is on.

Aspects of the present disclosure propose eligibility test criterion that may allow use of different transmission beams and sensing beams.

One proposed eligibility criterion may be understood by considering a sensing beam S with beam pattern $G_s(\theta)$ and a transmission beam T with beam pattern $G_T(\theta)$ for directional transmission. $\theta^*$ denotes a direction of peak EIRP of the transmission beam T, such that $EIRP_{\{max\}}=EIRP(\theta^*)$.

Figure 5A:
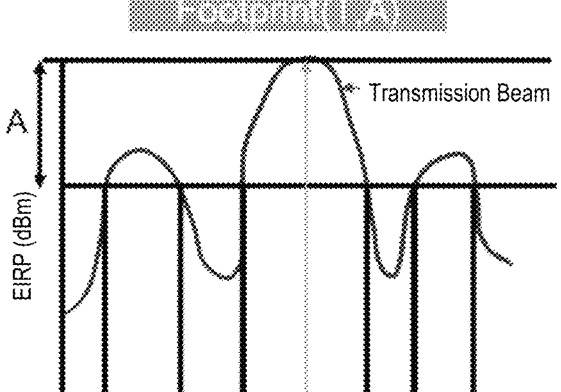
FIGS. 5A-5C depict proposed eligibility criterion for determining an eligible sensing beam, according to aspects of the present disclosure.

FIG. 5A illustrates example EIRP for the example transmission beam T. As illustrated, a footprint may be for transmission beam may be defined as:

$$\text{Footprint}(T, A)\text{: } \{\theta\text{: } EIRP(\theta) \geq EIRP_{\{max\}} - A\}$$

which generally refers to the set of transmission directions where EIRP for beam T is greater than a threshold ($EIRP_{\{max\}}-A$). In the example illustrated in FIG. 5A, the footprint has three transmission directions where the EIRP exceeds the threshold. As illustrated, the Footprint(T, A) may depend on both $G_T(\theta)$ and conducted/radiated power.

According to one proposal, a sensing beam S may be considered eligible for transmission beam T, Max EIRP, $EIRP_{\{max\}}$, with tolerance X dB if the following condition is met:

$$G_S(\theta) \geq G_s(\theta*) - X \text{ for any choice of } \theta \in \text{Footprint}(T, A).$$

Figure 5B:
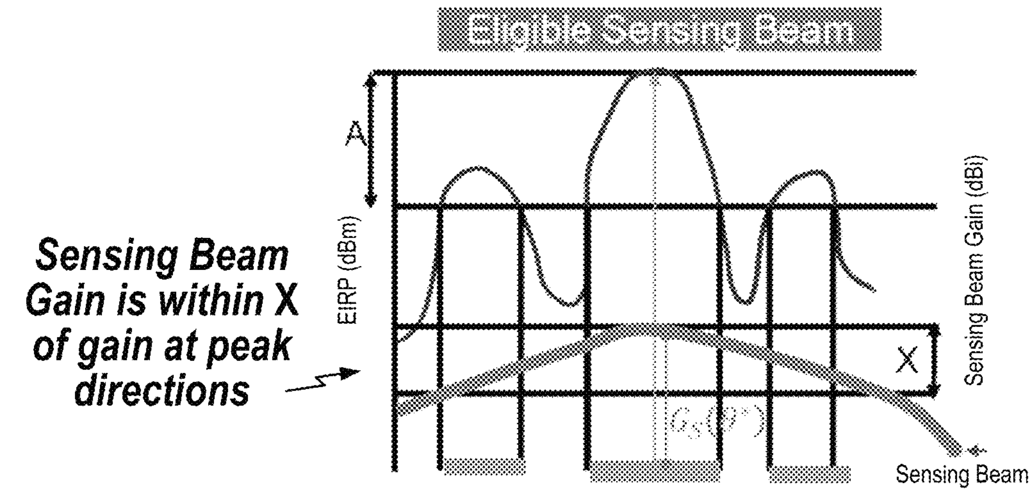
Figure 5C:
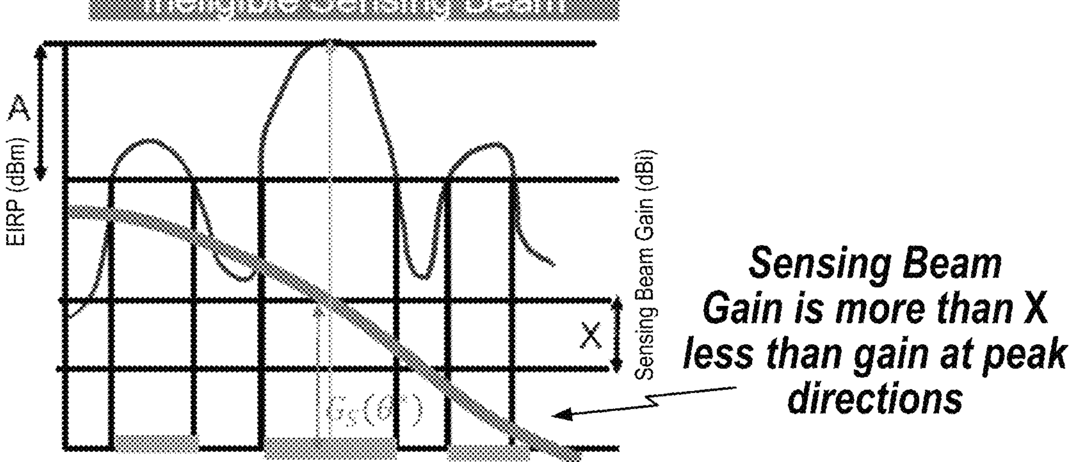

In other words, as illustrated in FIGS. 5B and 5C, the sensing beam gain is measured in the directions where the transmission beam EIRP is within A dB of the peak EIRP. A sensing beam may be declared eligible if the sensing beam gain measured along the chosen directions is at most X dB less than the sensing beam gain in peak transmission directions.

In the example shown in FIG. 5B, the sensing beam would be declared eligible because the sensing beam game is within X dB of the sensing beam gain in the peak transmission directions. On the other hand, in the example shown in FIG. 5C, the sensing beam would not be declared eligible because the sensing beam gain is more than X dB less than the sensing beam gain in some of the peak transmission directions.

According to certain aspects, a directional adaptivity test (e.g., LBT for silencing a transmitter) may be performed to confirm that sensing beams determined as eligible based on the testing criteria conform to LBT silencing requirements.

The rationale for such testing may be that if the sensing beam gain is reduced by not more than X dB (based on the criteria described above) then the interfering (jammer) power needed to silence a transmitter (for LBT), the sensing unit may be expected to be increased by not more than X dB. A 'jammer' or 'interferer' with given power and placement may be used to verify the proposed eligibility rule on sensing for LBT as part of an adaptivity/conformance test.

Figure 6A:
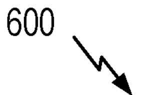
FIGS. 6A-6B depict a proposed conformance test for an eligible sensing beam, according to aspects of the present disclosure.
Figure 6A:
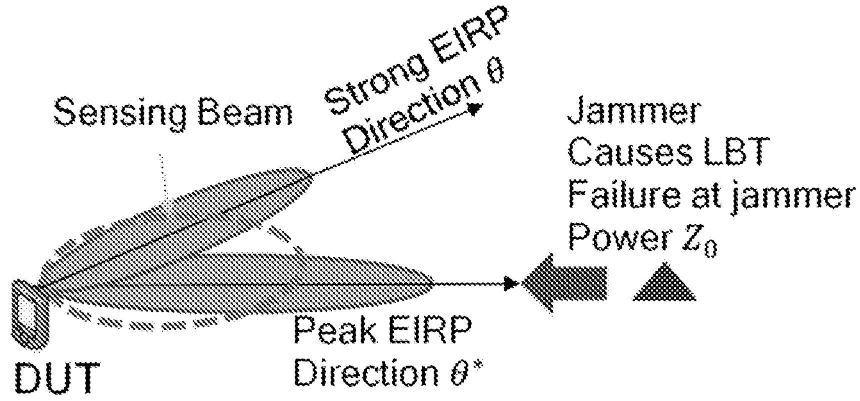
Figure 6B:
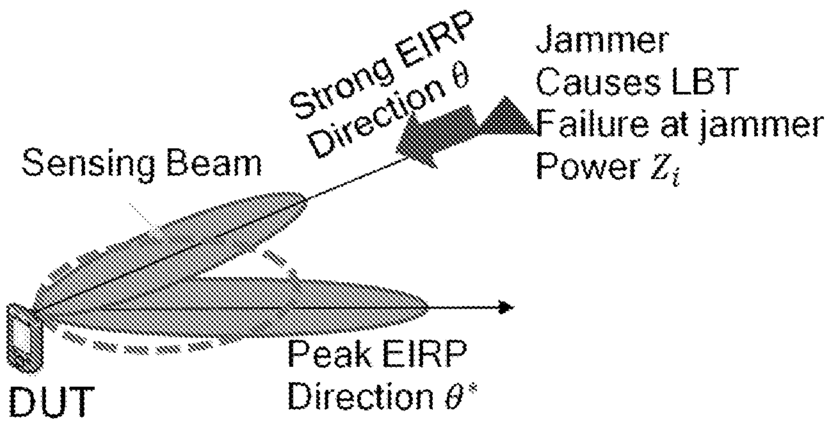

Such a directional adaptivity test may involve the following steps:

Step 0: Conduct a test on the Device Under Test (DUT) to determine the EIRP profile EIRP(θ) and Footprint (T,A);

Step 1: An adaptivity test (e.g., as specified by regulation) is conducted along a direction of maximum transmit EIRP (as shown in FIG. 6A); The interferer power may be changed from small to large values to determine the energy level of the interferer that silences the transmitter; As shown in FIG. 6A, that power level is recorded as $Z_0$; In some cases, Step 1 may conform to standard regulation/specifications for an adaptivity test;

Step 2: Sufficiently granular sample directions i in the Footprint(T, A) may be selected; As shown in FIG. 6B, On a given direction i, the adaptivity test may be conducted by placing an interferer and determining energy injected that silences the transmitter; this power level of the interferer may be recorded as $Z_i$;

Step 3: The sensing beam and threshold combination may be considered valid if $Z_i \leq Z_0+X$ dBm for all selected directions i.

In other words, a sensing beam passes this eligibility test if $Z_i \leq Z_0+X$ for a set of choices of directions θ.

Other alternatives for determining eligibility may also be used. For example, instead of using fixed tolerance threshold of X dB for eligibility, an actual difference in measurements of EIRP is used to determine the lower bound on sensing gain.

For example, a Footprint(T,A), EIRP(θ), EIRP_{max} and θ* may be defined as in the example above. In this case, however, sensing beam S may be considered eligible for transmission beam T, Max EIRP, $EIRP_{\{max\}}$, with tolerance X dB if:

$$G_S(\theta) \geq G_s(\theta*) - EIRP_{\{max\}} + EIRP(\theta) - X \text{ for any choice of } \theta \in \text{Footprint}(T, A)$$

One potential advantage of this approach is that this approach is less sensitive to the choice of parameter A.

This criteria (and beams declared eligible based thereon) may be tested (validated) in the same way as described above, where the condition:

$$G_S(\theta) - G_s(\theta*) \geq -\alpha,$$

may be verified by checking:

$$Z(\theta) - Z(\theta^*) \geq +\alpha,$$

where Z(θ), Z(θ*) are respectively minimum power of the interferer for which the device under test does not make a transmission due to LBT failure, when placed in directions θ, θ* respectively, and the parameter a may be defined as:

$$\alpha = EIRP_{(max)} - EIRP(\theta) + X.$$

Figure 7:
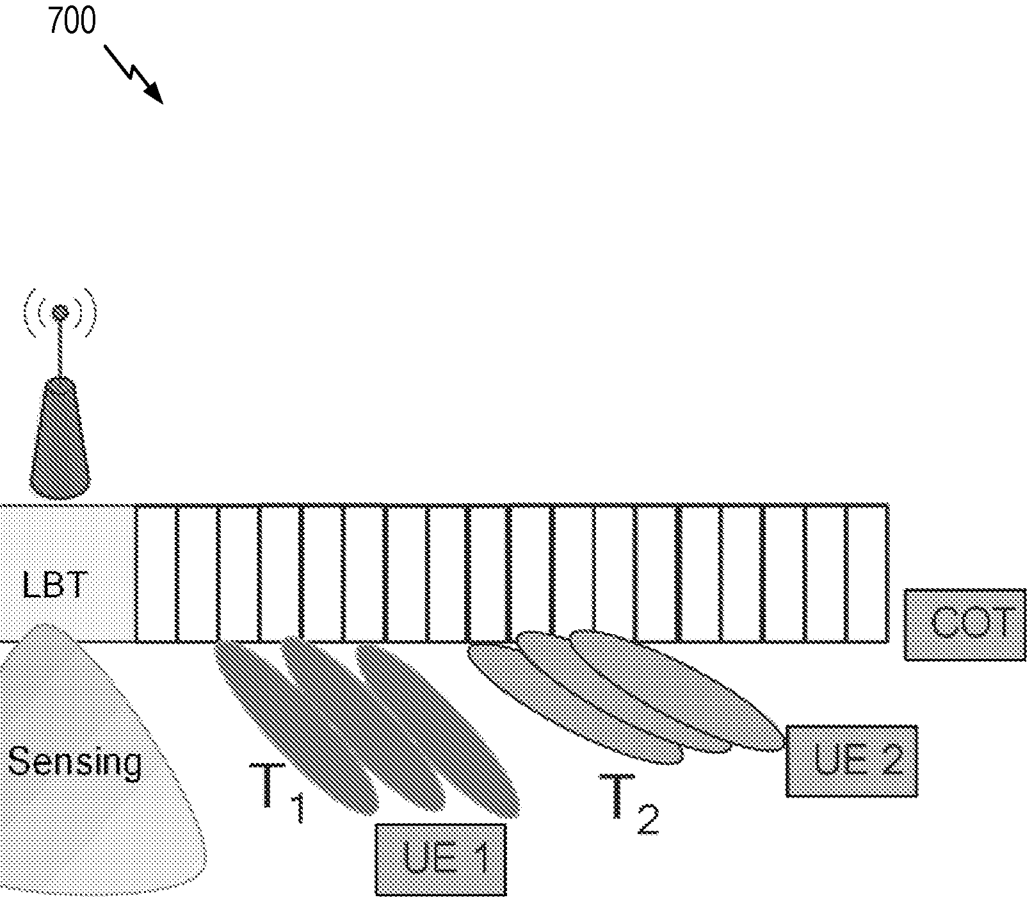
FIG. 7 depicts an example of an eligible sensing beam for multiple transmission beams, according to aspects of the present disclosure.

In some cases, a sensing beam can be eligible sensing beam for a number of transmitting beams. For example, FIG. 7 illustrates how a sensing beam S may be used for LBT for a Multi-Transmission Beam COT (a COT in which multiple transmission beams T1 and T2 will be used).

In such cases, to determine eligibility of sensing beam S, the eligibility rules may be applied on each of the component transmission beams. For example, if $T_1$, $T_2$ are two beams to be used for transmission in a COT as shown in FIG. 7, with peak EIRP in directions $\theta^*_1$ and $\theta^*_2$, and sensing beam S is used as a common sensing beam then the following conditions may both need to be satisfied:

$G_S(\theta) \geq G_s(\theta_1^*) - X$ for any choice of $\theta \in$ Footprint($T_1$, A); AND
$G_S(\theta) \geq G_s(\theta_2^*) - X$ for any choice of $\theta \in$ Footprint($T_2$, A).

In other words, this the test may effectively consist of running the conformance test described above on two transmit beams $T_1$ and $T_2$.

There are various potential benefits of the sensing beam eligibility criterion proposed herein. For example, the proposed criterion may simplify the challenging task of connecting transmit beam gains to sensing beam gains adequately, without requiring manufacturers to specify beam patterns. Relative gains of sensing beams can be obtained via an extension of the adaptivity test. As noted above, the criterion and the testing procedure can be applied to: (1) Widebeam sensing and multi-beam COT; and (2) Independent per beam LBT. Further, the eligibility criterion may be independent of ED threshold. The eligibility test proposed herein may take energy detection (ED) calculation into account, indirectly, by requiring that the device pass regulation conformation test for LBT (e.g., ETSI EN302567) under the sensing beam in question. The testing procedures proposed herein may need to know the ED threshold used to set the interferer power. As an alternative, the testing procedure may determine the value (of the ED threshold) by search.

Example Methods

Figure 8:
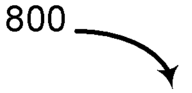
FIG. 8 shows an example method for determining eligible sensing beams for use in channel sensing, according to aspects of the present disclosure.
Figure 8:
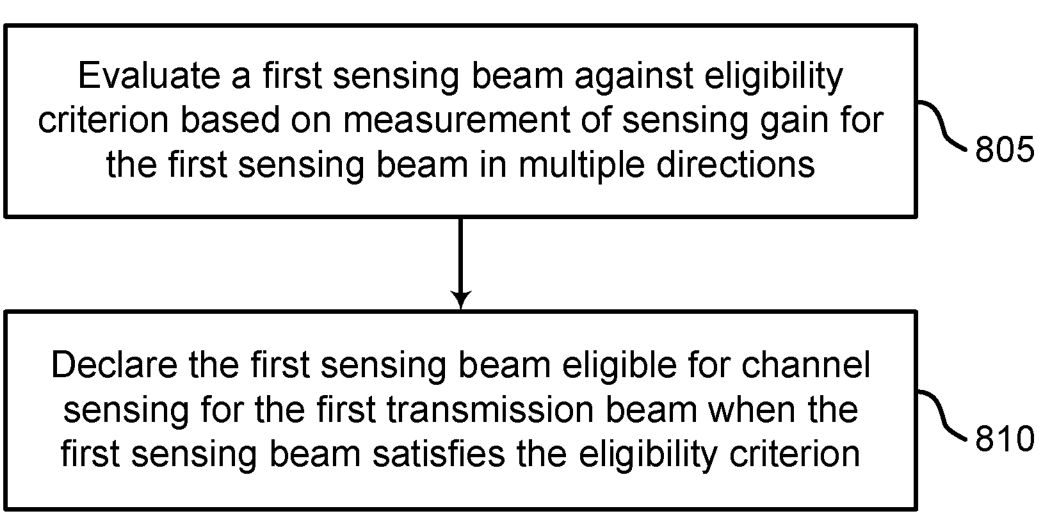

FIG. 8 shows an example of a method 800 for determining eligible sensing beams for use in channel sensing by a DUT according to aspects of the present disclosure. In some aspects, a user equipment, such as UE 104 in FIGS. 1 and 2, or processing system 905 of FIG. 9, may perform the method 800. In some cases, the procedure may be performed in a lab environment. In any case, after eligible sensing beams are determined, a device (e.g., a UE) may be configured with information associating eligible sensing beams (or sensing beam patterns) with transmission beams (or transmission beam patterns).

At operation 805, the system evaluates the first sensing beam against eligibility criterion based on measurement of sensing gain for the first sensing beam in multiple directions. In some cases, the operations of this step refer to, or may be performed by, sensing beam evaluation circuitry as described with reference to FIG. 9.

At operation 810, the system declares the first sensing beam eligible for channel sensing for the first transmission beam when the first sensing beam satisfies the eligibility criterion. In some cases, the operations of this step refer to, or may be performed by, channel sensing circuitry as described with reference to FIG. 9.

In some aspects, the method 800 further includes measuring radiated power from the transmission beam across a range of directions to determine the multiple directions.

In some aspects, the multiple directions correspond to directions where a radiated power from the transmission beam is greater than a first threshold. In some aspects, the first threshold is determined based on a peak radiated power from the transmission beam reduced by a first parameter.

In some aspects, the eligibility criterion comprises the sensing beam gain measured in each of the multiple directions is at most a second threshold less than a sensing beam gain measured in a direction corresponding to a peak radiated power from the transmission beam. In some aspects, the second threshold is fixed for each of the multiple directions. In some aspects, the second threshold is determined, for each of the multiple directions, based on a difference between the peak radiated power and a radiated power measured in that direction.

In some aspects, the method 800 further includes performing a test to validate eligibility of the sensing beam. In some aspects, performing the test comprises measuring a first power level from an interferer, along a direction corresponding to a peak radiated power from the transmission beam, at which the DUT declares a busy channel, measuring second power levels, along one or more of the multiple directions, at which the DUT declares a busy channel, and declaring the sensing beam valid if each of the measured second power levels is within a threshold value of the first power level.

In some aspects, the method 800 further includes evaluating the first sensing beam against eligibility criterion for a second transmission beam based on measurement of sensing gain for the first sensing beam in multiple directions. Some aspects further include declaring the first sensing beam as eligible for channel sensing for the first and second transmission beam when the first sensing beam also satisfies the eligibility criterion for the second transmission beam.

In some aspects, the method 800 further includes performing a test to validate eligibility of the sensing beam for the first and second transmission beams.

Example Wireless Communication Device

Figure 9:
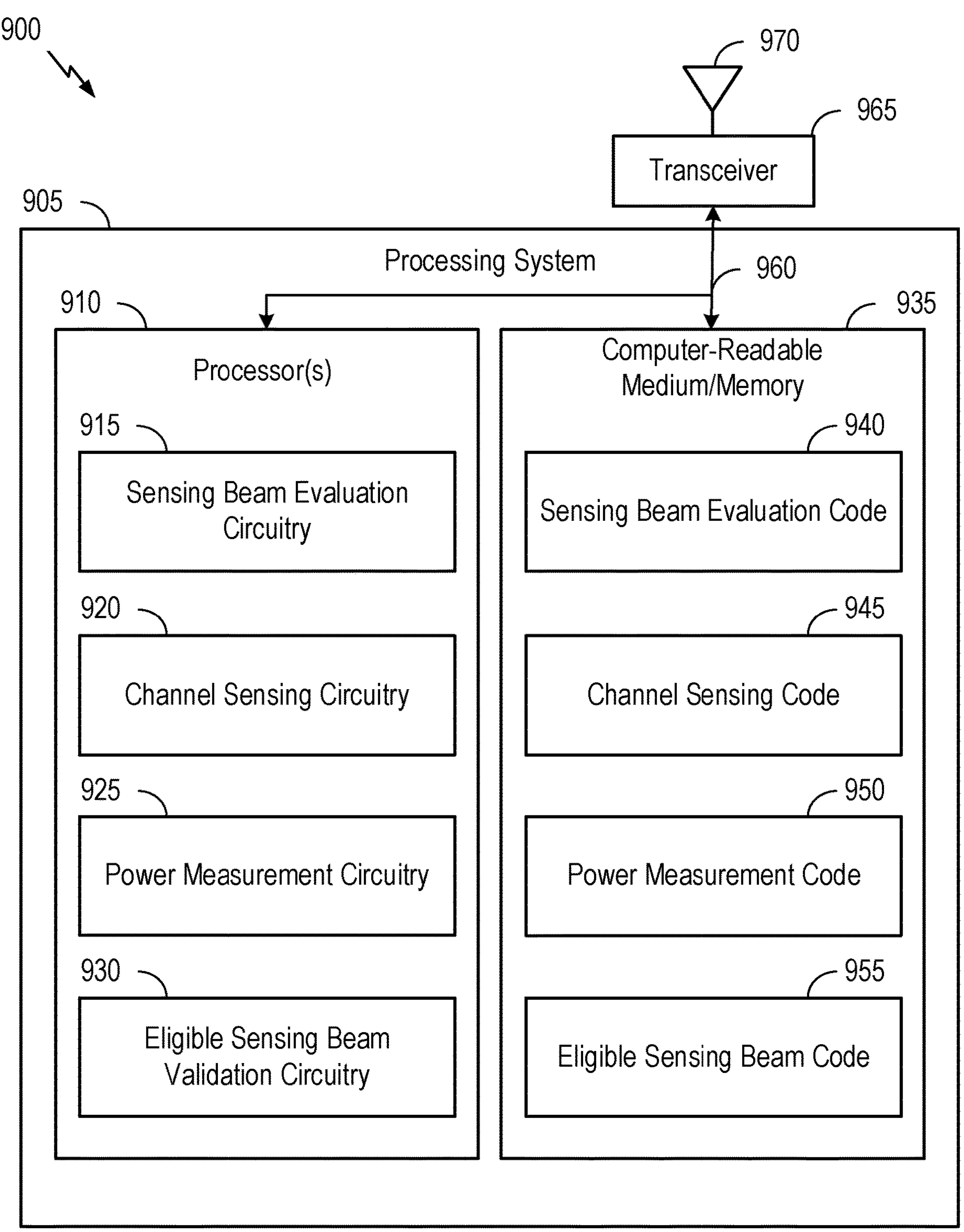
FIG. 9 shows an example of a communications device according to aspects of the present disclosure.

FIG. 9 depicts an example communications device 900 that includes various components operable, configured, or adapted to perform operations for the techniques disclosed herein, such as the operations depicted and described with respect to FIG. 8. In some examples, communication device may be a user equipment 104 (or base station or other device) as described, for example with respect to FIGS. 1 and 2.

Communications device 900 includes a processing system 905 coupled to a transceiver 965 (e.g., a transmitter and/or a receiver). Transceiver 965 is configured to transmit (or send) and receive signals for the communications device 900 via an antenna 970, such as the various signals as described herein. Processing system 905 may be configured to perform processing functions for communications device 900, including processing signals received and/or to be transmitted by communications device 900.

Processing system 905 includes one or more processors 910 coupled to a computer-readable medium/memory 935 via a bus 960. In certain aspects, computer-readable medium/memory 935 is configured to store instructions (e.g., computer-executable code) that when executed by the one or more processors 910, cause the one or more processors 910 to perform the operations illustrated in FIG. 8, or other operations for performing the various techniques discussed herein.

In some examples, one or more processors 910 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 910 are configured to operate a memory array using a memory controller. In other cases, a memory controller is integrated into the one or more processors 910. In some cases, the one or more processors 910 are configured to execute computer-readable instructions stored in a memory to perform various functions. In some aspects, one or more processors 910 include special purpose components for modem processing, baseband processing, digital signal processing, or transmission processing.

In one aspect, computer-readable medium/memory 935 includes (e.g., stores) sensing beam evaluation code 940, channel sensing code 945, power measurement code 950, and eligible sensing beam code 955.

Examples of a computer-readable medium/memory 935 include random access memory (RAM), read-only memory (ROM), or a hard disk. Examples of memory devices include solid state memory and a hard disk drive. In some examples, computer-readable medium/memory 935 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A transceiver 965 may communicate bi-directionally, via antennas 970, wired, or wireless links as described above. For example, the transceiver 965 may represent a wireless transceiver 965 and may communicate bi-directionally with another wireless transceiver 965. The transceiver 965 may also include or be connected to a modem to modulate the packets and provide the modulated packets to for transmission, and to demodulate received packets. In some examples, transceiver 965 may be tuned to operate at specified frequencies. For example, a modem can configure the transceiver 965 to operate at a specified frequency and power level based on the communication protocol used by the modem.

Various components of communications device 900 may provide means for performing the methods described herein, including with respect to FIG. 8.

In some examples, means for transmitting or sending (or means for outputting for transmission) may include the transceivers 254 and/or antenna(s) 252 of the user equipment 104 illustrated in FIG. 2 and/or transceiver 965 and antenna 970 of the communication device in FIG. 9.

In some examples, means for receiving (or means for obtaining) may include the transceivers 254 and/or antenna(s) 252 of the user equipment 104 illustrated in FIG. 2 and/or transceiver 965 and antenna 970 of the communication device in FIG. 9.

In some examples, means for evaluating and/or declaring may include various processing system 905 components, such as: the one or more processors 910 in FIG. 9, or aspects of the user equipment 104 depicted in FIG. 2, including receive processor 258, transmit processor 264, TX MIMO processor 266, and/or controller/processor 280.

In one aspect, one or more processors 910 include sensing beam evaluation circuitry 915, channel sensing circuitry 920, power measurement circuitry 925, and eligible sensing beam validation circuitry 930.

According to some aspects, sensing beam evaluation circuitry 915 evaluates the first sensing beam against eligibility criterion based on measurement of sensing gain for the first sensing beam in multiple directions. In some examples, the multiple directions correspond to directions where a radiated power from the transmission beam is greater than a first threshold. In some examples, the first threshold is determined based on a peak radiated power from the transmission beam reduced by a first parameter.

In some examples, the eligibility criterion includes the sensing beam gain measured in each of the multiple directions is at most a second threshold less than a sensing beam gain measured in a direction corresponding to a peak radiated power from the transmission beam. In some examples, the second threshold is fixed for each of the multiple directions. In some examples, the second threshold is determined, for each of the multiple directions, based on a difference between the peak radiated power and a radiated power measured in that direction.

In some examples, sensing beam evaluation circuitry 915 evaluates the first sensing beam against eligibility criterion for a second transmission beam based on measurement of sensing gain for the first sensing beam in multiple directions. In some examples, sensing beam evaluation circuitry 915 performs a test to validate eligibility of the sensing beam for the first and second transmission beams.

According to some aspects, channel sensing circuitry 920 declares the first sensing beam eligible for channel sensing for the first transmission beam when the first sensing beam satisfies the eligibility criterion. In some examples, channel sensing circuitry 920 declares the first sensing beam as eligible for channel sensing for the first and second transmission beam when the first sensing beam also satisfies the eligibility criterion for the second transmission beam.

According to some aspects, power measurement circuitry 925 measures radiated power from the transmission beam across a range of directions to determine the multiple directions.

According to some aspects, eligible sensing beam validation circuitry 930 performs a test to validate eligibility of the sensing beam. In some examples, performing the test includes measuring a first power level from an interferer, along a direction corresponding to a peak radiated power from the transmission beam, at which the DUT declares a busy channel, measuring second power levels, along one or more of the multiple directions, at which the DUT declares a busy channel, and declaring the sensing beam valid if each of the measured second power levels is within a threshold value of the first power level.

Notably, FIG. 9 is just use example, and many other examples and configurations of communication device are possible.

Example Clauses

Implementation examples are described in the following numbered clauses:

Clause 1: A method for determining if a first sensing beam is eligible for use in channel sensing by a DUT for at least a first transmission beam, comprising: evaluating the first sensing beam against eligibility criterion based on measurement of sensing gain for the first sensing beam in multiple directions; and declaring the first sensing beam eligible for channel sensing for the first transmission beam when the first sensing beam satisfies the eligibility criterion.

Clause 2: The method of Clause 1, wherein: the multiple directions correspond to directions where a radiated power from the transmission beam is greater than a first threshold.

Clause 3: The method of Clause 2, further comprising: measuring radiated power from the transmission beam across a range of directions to determine the multiple directions.

Clause 4: The method of Clause 2, wherein: the first threshold is determined based on a peak radiated power from the transmission beam reduced by a first parameter.

Clause 5: The method of Clause 2, wherein: the eligibility criterion comprises the sensing beam gain measured in each of the multiple directions is at most a second threshold less than a sensing beam gain measured in a direction corresponding to a peak radiated power from the transmission beam.

Clause 6: The method of Clause 5, wherein: the second threshold is fixed for each of the multiple directions.

Clause 7: The method of Clause 5, wherein: for each of the multiple directions, the second threshold is determined based on a difference between the peak radiated power and a radiated power measured in that direction.

Clause 8: The method of any one of Clauses 1-7, further comprising: performing a test to validate eligibility of the sensing beam.

Clause 9: The method of Clause 8, wherein: performing the test comprises measuring a first power level from an interferer, along a direction corresponding to a peak radiated power from the transmission beam, at which the DUT declares a busy channel; measuring second power levels, along one or more of the multiple directions, at which the DUT declares a busy channel; and declaring the sensing beam valid if each of the measured second power levels is within a threshold value of the first power level.

Clause 10: The method of any one of Clauses 1-9, further comprising: evaluating the first sensing beam against eligibility criterion for a second transmission beam based on measurement of sensing gain for the first sensing beam in multiple directions; and declaring the first sensing beam as eligible for channel sensing for the first and second transmission beam when the first sensing beam also satisfies the eligibility criterion for the second transmission beam.

Clause 11: The method of Clause 10, further comprising: performing a test to validate eligibility of the sensing beam for the first and second transmission beams.

Clause 12: An apparatus, comprising: a memory comprising computer-executable instructions; one or more processors configured to execute the computer-executable instructions and cause the apparatus to perform a method in accordance with any one of Clauses 1-11.

Clause 13: An apparatus, comprising means for performing a method in accordance with any one of Clauses 1-11.

Clause 14: A non-transitory computer-readable medium comprising computer-executable instructions that, when executed by one or more processors of an apparatus, cause the apparatus to perform a method in accordance with any one of Clauses 1-11.

Clause 15: A computer program product embodied on a computer-readable storage medium comprising code for performing a method in accordance with any one of Clauses 1-11.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an SI interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mm Wave frequencies, the gNB 180 may be referred to as an mm Wave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where Dis DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2$\mu$ slots/subframe. The subcarrier spacing and symbol length/duration are a function of the numerology. The subcarrier spacing may be equal to $2^{\mu} \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of criterion for determining eligibility of sensing beams in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the apparatus to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for determining if a first sensing beam is eligible for use in channel sensing by a device under test (DUT) for at least a first transmission beam, comprising:
   evaluating the first sensing beam against eligibility criterion based on measurement of sensing gain for the first sensing beam in multiple directions;
   declaring the first sensing beam eligible for channel sensing for the first transmission beam when the first sensing beam satisfies the eligibility criterion, wherein the eligibility criterion comprises the sensing gain, measured in each of the multiple directions, is greater than or equal to a peak sensing beam gain minus a tolerance threshold; and
   performing a directional adaptivity test to validate eligibility of the first sensing beam.

2. The method of claim 1, wherein the multiple directions correspond to directions where a radiated power from the first transmission beam is greater than the peak radiated power from the first transmission beam reduced by a parameter.

3. The method of claim 2, further comprising measuring the radiated power from the first transmission beam across a range of directions to determine the multiple directions.

4. The method of claim 1, wherein the tolerance threshold comprises a fixed value for each of the multiple directions.

5. The method of claim 1, wherein, for each of the multiple directions, the tolerance threshold is determined based on a difference between the peak radiated power and a radiated power measured in that direction.

6. The method of claim 1, wherein performing the directional adaptivity test comprises:
   measuring a first power level from an interferer, along a direction corresponding to a peak radiated power from the first transmission beam, at which the DUT declares a busy channel;
   measuring second power levels, along one or more of the multiple directions, at which the DUT declares a busy channel;
   determining whether each of the measured second power levels is within a threshold value of the first power level; and
   declaring the first sensing beam valid when each of the measured second power levels is within the threshold value of the first power level.

7. The method of claim 6, wherein the threshold value is the tolerance threshold, and wherein determining whether each of the measured second power levels is within the threshold value of the first power level comprises determining whether each of the measured second power levels is less than or equal to a sum of the first power level and the tolerance threshold.

8. The method of claim 1, further comprising:
   evaluating the first sensing beam against an eligibility criterion for a second transmission beam based on the measurement of the sensing gain for the first sensing beam in multiple directions; and
   declaring the first sensing beam as eligible for channel sensing for the first and second transmission beam when the first sensing beam also satisfies the eligibility criterion for the second transmission beam, wherein the eligibility criterion for the second transmission beam comprises the sensing gain, measured in each of the multiple directions, is greater than or equal to a second peak sensing beam gain minus the tolerance threshold.

9. The method of claim 8, wherein performing the directional adaptivity test comprises performing the directional adaptivity test to validate eligibility of the first sensing beam for the first and second transmission beams.

10. An apparatus for determining if a first sensing beam is eligible for use in channel sensing by a device under test (DUT) for at least a first transmission beam, comprising:
   at least one memory; and
   at least one processor coupled to the at least one memory, the at least one memory and the at least one processor configured to:
   evaluate the first sensing beam against eligibility criterion based on measurement of sensing gain for the first sensing beam in multiple directions;
   declare the first sensing beam eligible for channel sensing for the first transmission beam when the first sensing beam satisfies the eligibility criterion, wherein the eligibility criterion comprises the sensing gain, measured in each of the multiple directions, is greater than or equal to a peak sensing beam gain minus a tolerance threshold; and
   perform a directional adaptivity test to validate eligibility of the first sensing beam.

11. The apparatus of claim 10, wherein the multiple directions correspond to directions where a radiated power from the first transmission beam is greater than the peak radiated power from the first transmission beam reduced by a parameter.

12. The apparatus of claim 11, wherein the at least one memory and the at least one processor are further configured to measure the radiated power from the first transmission beam across a range of directions to determine the multiple directions.

13. The apparatus of claim 10, wherein the tolerance threshold comprises a fixed value for each of the multiple directions.

14. The apparatus of claim 10, wherein, for each of the multiple directions, the tolerance threshold is determined based on a difference between the peak radiated power and a radiated power measured in that direction.

15. The apparatus of claim 10, wherein to perform the directional adaptivity test, the at least one memory and the at least one processor are further configured to:
   measure a first power level from an interferer, along a direction corresponding to a peak radiated power from the first transmission beam, at which the DUT declares a busy channel;
   measure second power levels, along one or more of the multiple directions, at which the DUT declares a busy channel;
   determine whether each of the measured second power levels is within a threshold value of the first power level; and
   declare the first sensing beam valid when each of the measured second power levels is within a threshold value of the first power level.

16. The apparatus of claim 10, wherein the at least one memory and the at least one processor are further configured to:
   evaluate the first sensing beam against an eligibility criterion for a second transmission beam based on the measurement of the sensing gain for the first sensing beam in multiple directions; and
   declare the first sensing beam as eligible for channel sensing for the first and second transmission beam when the first sensing beam also satisfies the eligibility criterion for the second transmission beam, wherein the eligibility criterion for the second transmission beam comprises the sensing gain, measured in each of the multiple directions, is greater than or equal to a second peak sensing beam gain minus the tolerance threshold.

17. The apparatus of claim 16, wherein the at least one memory and the at least one processor are further configured to perform the directional adaptivity test to validate eligibility of the first sensing beam for the first and second transmission beams.

18. The apparatus of claim 15, wherein the threshold value is the tolerance threshold, and wherein to determine whether each of the measured second power levels is within the threshold value of the first power level, the at least one memory and the at least one processor are further configured to determine whether each of the measured second power levels is less than or equal to a sum of the first power level and the tolerance threshold.

19. A non-transitory computer-readable medium having instructions stored thereon, that when executed by one or more processors, cause the one or more processors to perform operations comprising:

evaluating a first sensing beam against eligibility criterion based on measurement of sensing gain for the first sensing beam in multiple directions;

declaring the first sensing beam eligible for use channel sensing by a device under test (DUT) for a first transmission beam when the first sensing beam satisfies the eligibility criterion, wherein the eligibility criterion comprises the sensing gain, measured in each of the multiple directions, is greater than or equal to a peak sensing beam gain minus a tolerance threshold; and performing a directional adaptivity test to validate eligibility of the first sensing beam.

20. The non-transitory computer-readable medium of claim 19, wherein performing the directional adaptivity test comprises:

measuring a first power level from an interferer, along a direction corresponding to a peak radiated power from the first transmission beam, at which the DUT declares a busy channel;

measuring second power levels, along one or more of the multiple directions, at which the DUT declares a busy channel; and declaring the first sensing beam valid if each of the measured second power levels is within a threshold value of the first power level.

* * * * *